(No Model.)
W. & F. BROCKHAUSEN.
ADJUSTABLE BEARING FOR CONNECTING RODS.
No. 519,492.  Patented May 8, 1894.
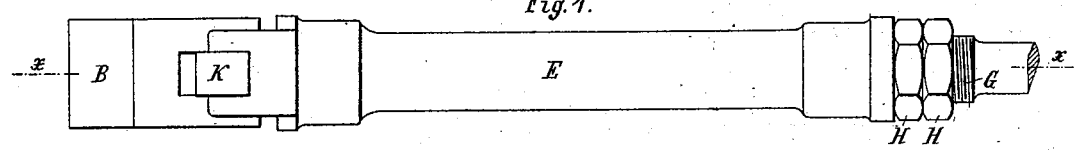
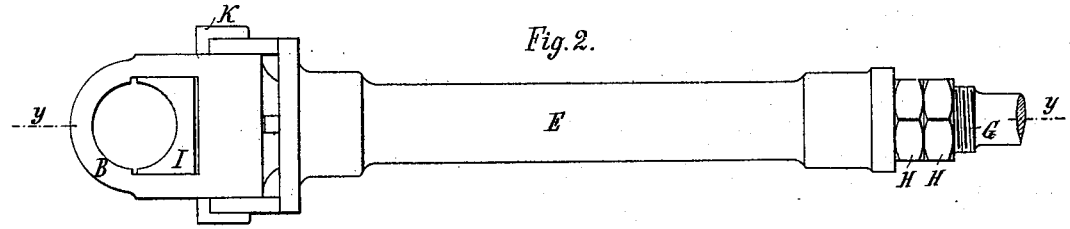
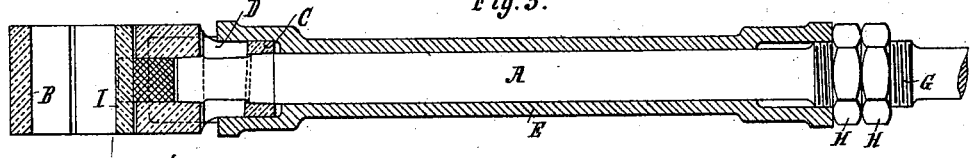
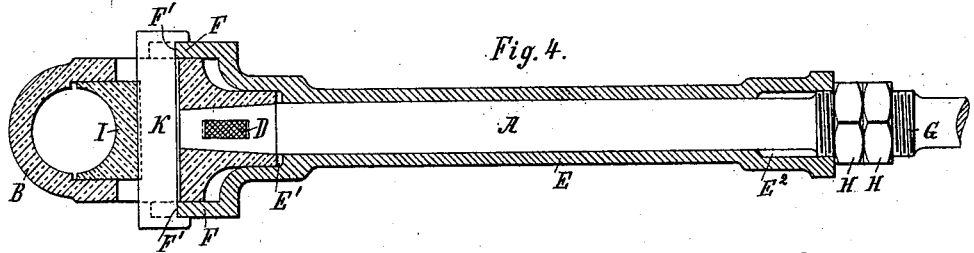
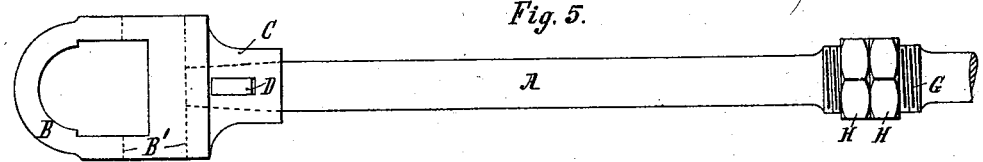
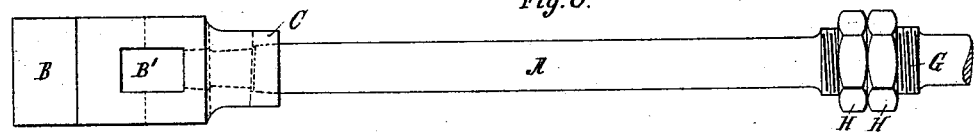
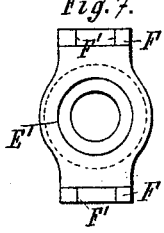
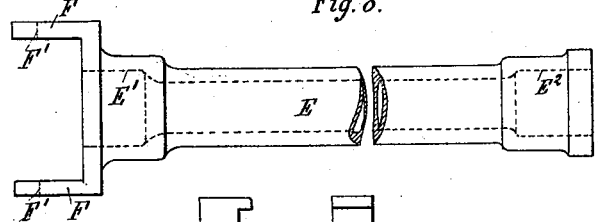
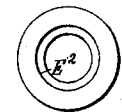
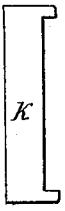
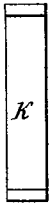
WITNESSES:
Charles Schroeder
H Ireland Griffiths
INVENTORS
W. Brockhausen.
F. Brockhausen
by Goepel & Rueymer
ATTORNEYS.

UNITED STATES PATENT OFFICE.

WILHELM BROCKHAUSEN AND FRIEDRICH BROCKHAUSEN, OF RIGA, RUSSIA.

ADJUSTABLE BEARING FOR CONNECTING-RODS.

SPECIFICATION forming part of Letters Patent No. 519,492, dated May 8, 1894.

Application filed October 18, 1893. Serial No. 488,500. (No model.) Patented in Belgium June 7, 1893, No. 104,985.

*To all whom it may concern:*

Be it known that we, WILHELM BROCKHAUSEN and FRIEDRICH BROCKHAUSEN, subjects of the Emperor of Germany, and residents of Riga, in the Empire of Russia, have invented certain new and useful Improvements in Adjustable Bearings for Connecting Rods or Links, (for which we have obtained Letters Patent in Belgium, No. 104,985, dated June 7, 1893,) of which the following is a specification.

The object of our invention is to provide a new and improved adjustable bearing for connecting rods and links, which is so constructed that the bearing blocks at that end of the connecting rod which is not readily accessible, can be adjusted from a point on said rod a greater or less distance from said bearing, that is, from a point that is readily accessible.

In the accompanying drawings, Figure 1 is a plan view of part of a connecting rod embodying our invention. Fig. 2 is a side view of the same. Fig. 3 is a horizontal longitudinal sectional view, on the line $y, y$, of Fig. 2. Fig. 4 is a vertical longitudinal sectional view, on the line $x, x$, of Fig. 1. Fig. 5 is a side view. Fig. 6 is a plan view of the connecting rod alone, with its head. Fig. 7 is a front end view of the sleeve on the connecting rod. Fig. 8 is a side view of the same, parts being broken out. Fig. 9 is a rear end view of the sleeve, and Figs. 10 and 11 are side face views of the gib.

Similar letters of reference indicate corresponding parts.

The connecting rod A is connected with its head B by means of the key D, which passes into the neck C of the head and through a slot in the tapered end of the rod A. The rod A is provided a greater or less distance from the tapered end at an accessible point with the raised screw-thread G for receiving the adjustable nuts H H. The head B is shaped to receive one of the bearing blocks I and is also provided with a slotted opening B', in which the gib K is fitted to slide in the direction of the length of the rod A and to bear against the bearing-block I. The sleeve E which is mounted to slide lengthwise on the rod A, is constructed at one end with a socket E' for receiving the neck C of the head B, and at the opposite end the sleeve E is provided with a similar socket $E^2$, into which more or less of the screw-thread G can pass when the sleeve E is shifted on the rod A in the direction of its length, for the purpose of permitting the insertion of the key D or the removal of the same. The sleeve E is further provided at the end having the socket E' with the two diametrically-opposite lugs F F, which project over the head B. The said lugs have recesses F' in their ends of such shape that the said recessed ends of the lugs embrace the gib K. When all the parts described and shown in the several figures are put together in the manner shown in Figs. 1 and 4, and the nuts H H are drawn up, the sleeve F is thereby moved in the direction of its length toward the head B and its lugs F F press the gib K against the back of the bearing block I, thereby tightening the same upon the journal or pin. The drawings, show a certain connecting rod with one bearing-block I only in the head, but it is obvious that instead of one bearing-block, as many may be inserted in the opening as may be necessary.

Having thus described our invention, we claim as new and desire to secure by Letters Patent—

1. The combination, with a connecting rod or link, of a bearing-head on one end of the same, a bearing-block in said head, a sleeve surrounding said rod, a gib in the head, which gib rests against the bearing-block, lugs on the sleeve resting against said gib, and nuts on the threaded part of the rod or link, which nuts serve for shifting the sleeve in the direction of its length, substantially as set forth.

2. The combination, with a connecting rod, provided with a raised screw-thread a greater or less distance from one end, a head provided with a slotted opening and with a neck for receiving the end of the connecting rod, a key passing through the neck of the head and through the end of the rod within said neck, a bearing-block in the head, a gib fitted to slide in the slotted opening of the head and to bear against said bearing-block, a sleeve surrounding the rod and having lugs extending over the head and embracing the gib, and nuts on the threaded part of the connecting rod, substantially as set forth.

3. The combination, with a connecting-rod, provided with a raised screw-threaded part a greater or less distance from one end, of a head provided with a slotted opening and having a neck for receiving the end of the connecting-rod, a key passing through said neck and the end of the connecting rod, a bearing block in said head, a gib fitted in the slotted opening of the head, to rest against said bearing-block, a sleeve mounted loosely on the connecting rod and provided at one end with a socket for receiving the neck of the head and with lugs projecting from said socket over the head, said lugs having recessed ends, and said sleeve being also provided at the opposite end with a socket for receiving the screw-threaded part of the rod, and nuts on the screw threaded part of the rod, substantially as set forth.

In testimony that we claim the foregoing as our invention we have signed our names in presence of two subscribing witnesses.

WILHELM BROCKHAUSEN.
FRIEDRICH BROCKHAUSEN.

Witnesses:
FRANZ BUTTMANN,
VILLE JORGENSEN.